United States Patent [19]

Craubner

[11] 4,348,243
[45] Sep. 7, 1982

[54] THERMAL INSULATION, A PROCESS FOR PREPARING SAID INSULATION AND A PIPE INSULATED THEREWITH

[75] Inventor: Ingo Craubner, Munich, Fed. Rep. of Germany

[73] Assignee: Wacker-Chemie GmbH, Munich, Fed. Rep. of Germany

[21] Appl. No.: 120,791

[22] Filed: Feb. 12, 1980

Related U.S. Application Data

[63] Continuation of Ser. No. 949,587, Oct. 10, 1978, abandoned.

[30] Foreign Application Priority Data

Oct. 24, 1977 [DE] Fed. Rep. of Germany ....... 2747579

[51] Int. Cl.$^3$ .......................... E04B 2/00; E04F 13/00
[52] U.S. Cl. ...................................... 156/71; 156/77; 428/36
[58] Field of Search .................... 428/35, 36; 264/45, 264/46.2; 138/149, 174, 175, DIG. 1, DIG. 7; 156/71, 77

[56] References Cited

U.S. PATENT DOCUMENTS

| 3,769,126 | 10/1973 | Kolek | 428/36 |
| 3,935,632 | 2/1976 | Matson | 138/149 |
| 3,948,294 | 4/1976 | Magarian | 428/36 |
| 4,040,165 | 8/1977 | Miessler | 138/149 |
| 4,080,999 | 3/1978 | Bulters | 138/175 |

Primary Examiner—Marion McCamish

[57] ABSTRACT

Thermal insulation which contains a plurality of contiguous hollow structures such as hollow spheres and an elastomer, preferably a silicone rubber, which fills the interstices between the contiguous structures. The insulation may be molded around a pipe by filling the space between the pipe and an annular jacket which is concentrically arranged around the pipe to be insulated with hollow structures, adding a thermosetting composition to fill the interstices between the structures while the structures are retained in their original position and thereafter curing the thermosetting compositions to an elastomeric solid.

1 Claim, 1 Drawing Figure

U.S. Patent          Sep. 7, 1982          4,348,243
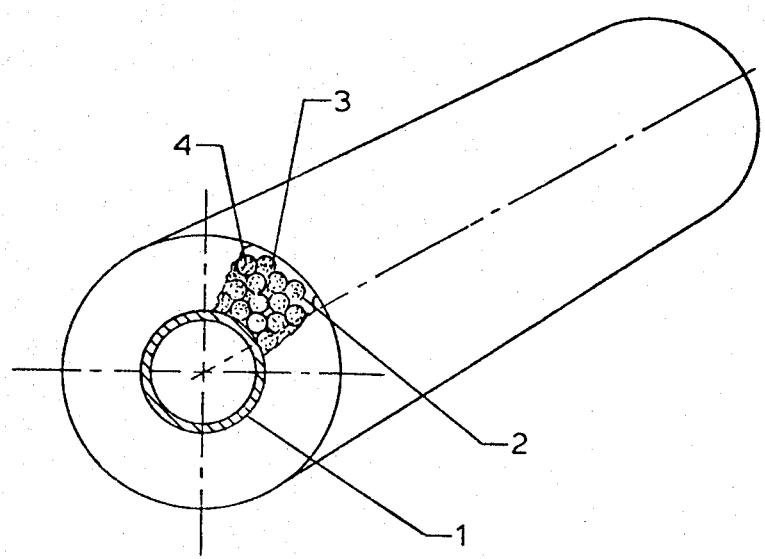

THERMAL INSULATION, A PROCESS FOR PREPARING SAID INSULATION AND A PIPE INSULATED THEREWITH

This is a continuation of application Ser. No. 949,587, filed Oct. 10, 1978, and now abandoned.

The present invention relates to thermal insulation material and to a method for preparing the same. More particularly, it relates to insulation material for use in insulating pipes and other objects, wherein the insulation material is molded to fit the surfaces to be insulated.

BACKGROUND OF THE INVENTION

Thermal insulation material for pipes have been known for a relatively long time (See Ullmanns Encyklopadie der technischen Chemie, 3rd Edition, Volume 1, Munich-Berlin 1951, page 290). Compared to the thermal insulation materials known heretofore, the material of this invention has certain advantages. For example, the thermal insulation can withstand a broad temperature range, i.e., from room temperature up to temperatures in excess of 200° C., has higher resistance to pressure so that if a pipe is placed in the ground it need not be encased in a concrete channel. Moreover, even if the surface of the insulation is damaged, water will not sufficiently penetrate the insulation to decrease the insulating effect and cause corrosion of the insulated object. Furthermore, it is no longer necessary to provide any cover for the insulation such as a jacketed pipe to prevent the penetration of water. Another advantage of this invention is that the insulation is more resistant to deterioration from the environment than other types of insulation. Likewise, the insulation material is more flame resistant than other types of insulation. Compared to the processes known heretofore for applying insulating materials to objects, the process of this invention has the advantage that it can be molded directly on to the object by the manufacturer of the object.

Therefore, it is an object of this invention to provide thermal insulation material which has a broad temperature range and is resistant to pressure. Another object of this invention is to provide thermal insulation material which is resistant to water penetration and deterioration from the environment. Still another object of this invention is to provide thermal insulation material which is flame resistant. A further object of this invention is to provide a process for preparing thermal insulation material. A still further object of this invention is to provide a thermally insulated object.

SUMMARY OF INVENTION

The foregoing objects and others which will become apparent from the following description are accomplished in accordance with this invention, generally speaking, by providing a thermally insulated object which has been surrounded with insulation material comprising a plurality of contiguous, hollow structures, whose interstices are filled with an elastomeric solid. The thermally insulated object is prepared by completely filling the space between a jacket which is concentrically arranged around the object with contiguous hollow structures, then adding a curable composition to fill the interstices between the contiguous structures while retaining the structures in their original position and thereafter curing the composition to a solid.

DESCRIPTION OF INVENTION

Referring to the drawing which illustrates one embodiment of this invention, there is shown a plan view of a thermal insulated article, partially in cross-section composed of a pipe (1) which is surrounded with the thermal insulation of this invention. The thermal insulation consists of contiguous hollow structures (2), each of which have at least one cavity (4) and an elastomeric material (3) which fills the interstices or spaces between the structures.

Only a section of the plurality contiguous hollow structures (2) having cavities (4) and the interstices (3) which are filled with elastomeric material are shown in the attached drawing. Of course all of the space between the pipe (1) and the outer circumference of the insulation (2) and (3) is to be filled.

The contiguous structures which have at least one inner cavity, may be spherical in configuration. However their shape may also be elliptical or polyhedral, or their surface may be irregular, such as that of pumice gravel. Their maximum size is limited by the thickness of the desired insulation, but the size of the contiguous structures, each of which has at least one cavity, can be the same size as the thickness of the insulation. The minimum size of the contiguous structures is limited by the viscosity of the compositions used for filling the interstices between said structures. It is preferred that the diameter of these contiguous structures be at least 3 mm.

When it is desired to make an insulation material having thermal and flame resistance, then the contiguous structures each of which have at least one cavity, should consist of an inorganic material, such as expanded clay spheres, hollow glass spheres which are larger than microspheres, spherical or irregularly shaped structures made of foam glass, as well as perlite or pumice gravel. Because of its greater resistance to pressure, expanded clay ("blow clay") is especially preferred. Where heat and flame resistance are not essential properties of the insulation, then the contiguous structures having at least one inner cavity may consist of organic material such as cork or plastics, e.g., foamed polystyrene or hollow spheres of vinyl chloride-ethylene copolymers.

The interstices between the contiguous structures, each of which contains at least one cavity, and of course the interstices between the surface of the contiguous structures and the object which is to be insulated, may be filled with compositions which cure to form elastomers, such as room temperature curable elastomers. Other compositions which may be employed to fill the interstices are heat curable compositions, i.e., compositions which cure to elastomeric solids when heated to elevated temperatures, e.g., above room temperature.

Organopolysiloxane based thermosetting compositions which cure at room temperature to form elastomers are the preferred compositions for filling the interstices of the contiguous structures having at least one cavity because of their resistance to aging, their ability to withstand broad temperature ranges and their ease of application. The organopolysiloxane compositions may consist of the generally known one or two-component systems. The two-component systems are preferred because they are more readily available. The curing of the organopolysiloxane compositions may take place through condensation or addition.

The thermosetting compositions which cure to form elastomers and which are used for filling the interstices between the contiguous structures can be mixed with additives which are generally used with such composition. Examples of such additives are reinforcing and non-reinforcing fillers, so-called microspheres made of glass or plastic, cell generating agents such as azodicarbonamide, biocides, heat-stabilizers, emollients, oxidation inhibitors and flame retardants, as well as substances which improve the adhesion of the products of this invention on the bases on which said solid products are applied. However, the compositions employed in accordance with this invention are not of the type which subsequent to curing are especially resistant to notching or impact.

An example of an organopolysiloxane-based composition which cures to an elastomer, in which the cross-linking agent serves simultaneously as a cell producing medium, is a mixture-consisting of 60 parts by weight of a dimethylpolysiloxane having terminal Si-bonded hydroxyl groups and a viscosity of 1000 cSt at 25° C., 10 parts by weight of a methylhydrogen polysiloxane which is endblocked with triorganosiloxy groups and a viscosity of 30 cSt at 25° C., 40 parts by weight of a vinyl-methylpolysiloxane diol having on the average 10 silicon atoms per molecule, 20 parts by weight of diatomaceous earth, 30 parts by weight of glass microspheres and 6 parts by weight of tin(II)octoate.

The thermal insulation materials of this invention are prepared by completely filling a mold with a plurality of structures each of which contains at least one inner cavity, then filling the interstices between the structures with a curable composition and thereafter curing the composition to form an elastomeric solid.

In another embodiment of this invention a pipe or conduit may be encompassed in the thermal insulation by completely filling the spaces between a shell which is concentrically placed around the pipe, with hollow structures, e.g., expanded clay spheres, then inserting at one end under pressure or under vacuum, a room temperature curable two-component organopolysiloxane composition until the space between the shell and the pipe is full and thereafter allowing the composition to cure to form an elastomeric solid. The expanded clay spheres may be kept in their original position by closing the opposite end of the outer shell, for example with a wire, net or cloth. When the pipe is placed in a vertical position, the curable composition is preferably introduced at the bottom. After the curable composition has cured, the outer jacket which serves to shape the insulating material can be removed and again be used for molding the thermal insulation material in accordance with this invention. The removal of the jacket is greatly simplified if it is hinged or if it consists of at least two sections.

What is claimed is:

1. A process for preparing a thermally insulated article which consists essentially of completely filling a space between the article to be insulated and a jacket which has been positioned concentrically around the article with a plurality of hollow structures, each in contact with adjacent hollow structures, maintaining the hollow structures in their original position while adding an organopolysiloxane composition capable of being cured to an elastomeric solid to said space to fill the interstices between the adjacent hollow structures, and thereafter curing the organopolysiloxane composition to an elastomer.

* * * * *